US005560386A

United States Patent [19]

Reiter et al.

[11] Patent Number: 5,560,386

[45] Date of Patent: Oct. 1, 1996

[54] METHOD FOR ADJUSTING A VALVE

[75] Inventors: Ferdinand Reiter, Markgröningen; Martin Maier, Möglingen, both of Germany

[73] Assignee: Robert Bosch GmbH, Stuttgart, Germany

[21] Appl. No.: 347,362

[22] PCT Filed: Mar. 19, 1994

[86] PCT No.: PCT/DE94/00309

§ 371 Date: Dec. 2, 1994

§ 102(e) Date: Dec. 2, 1994

[87] PCT Pub. No.: WO94/23195

PCT Pub. Date: Oct. 13, 1994

[30] Foreign Application Priority Data

Apr. 2, 1993 [DE] Germany .......................... 43 10 819.9

[51] Int. Cl.[6] .................................................... F16K 31/06

[52] U.S. Cl. .................... 137/1; 251/129.15; 251/129.21

[58] Field of Search ........................... 137/1; 251/129.15, 251/129.21; 239/585.1, 585.4, 585.5

[56] References Cited

U.S. PATENT DOCUMENTS

| | | |
|---|---|---|
| 4,832,314 | 5/1989 | Trott . |
| 4,915,350 | 4/1990 | Babitzka et al. .................. 251/129.15 |
| 4,967,966 | 11/1990 | Babitzka et al. ............... 251/129.15 X |
| 5,236,174 | 8/1993 | Vogt et al. ..................... 251/129.15 X |

FOREIGN PATENT DOCUMENTS

| | | |
|---|---|---|
| 0301381A1 | 2/1989 | European Pat. Off. . |
| 0352445A1 | 1/1990 | European Pat. Off. . |
| 0523405A2 | 1/1993 | European Pat. Off. . |
| 2942853A1 | 5/1980 | Germany . |
| 3727342A1 | 3/1989 | Germany . |
| 4211723A1 | 4/1993 | Germany . |
| 2034403 | 6/1980 | United Kingdom . |
| WO93/03274 | 2/1993 | WIPO . |
| WO93/12337 | 6/1993 | WIPO . |

*Primary Examiner*—Kevin Lee
*Attorney, Agent, or Firm*—Kenyon & Kenyon

[57] ABSTRACT

A method for the adjustment of the dynamic medium flow quantity of an electromagnetically actuated injection valve by an axial relative movement between the body of the valve and at least one guide element which at least partially circumferentially surrounds the valve's magnet coil on the circumference of the valve body. The ratio of magnetic useful flux to magnetic leakage flux, and thus the magnetic force, are varied so that the medium flow quantity can be influenced and adjusted. The final fixation of the at least one guide element takes place, for instance, by means of cementing, welding, clamping elements or resilient additional parts.

28 Claims, 1 Drawing Sheet

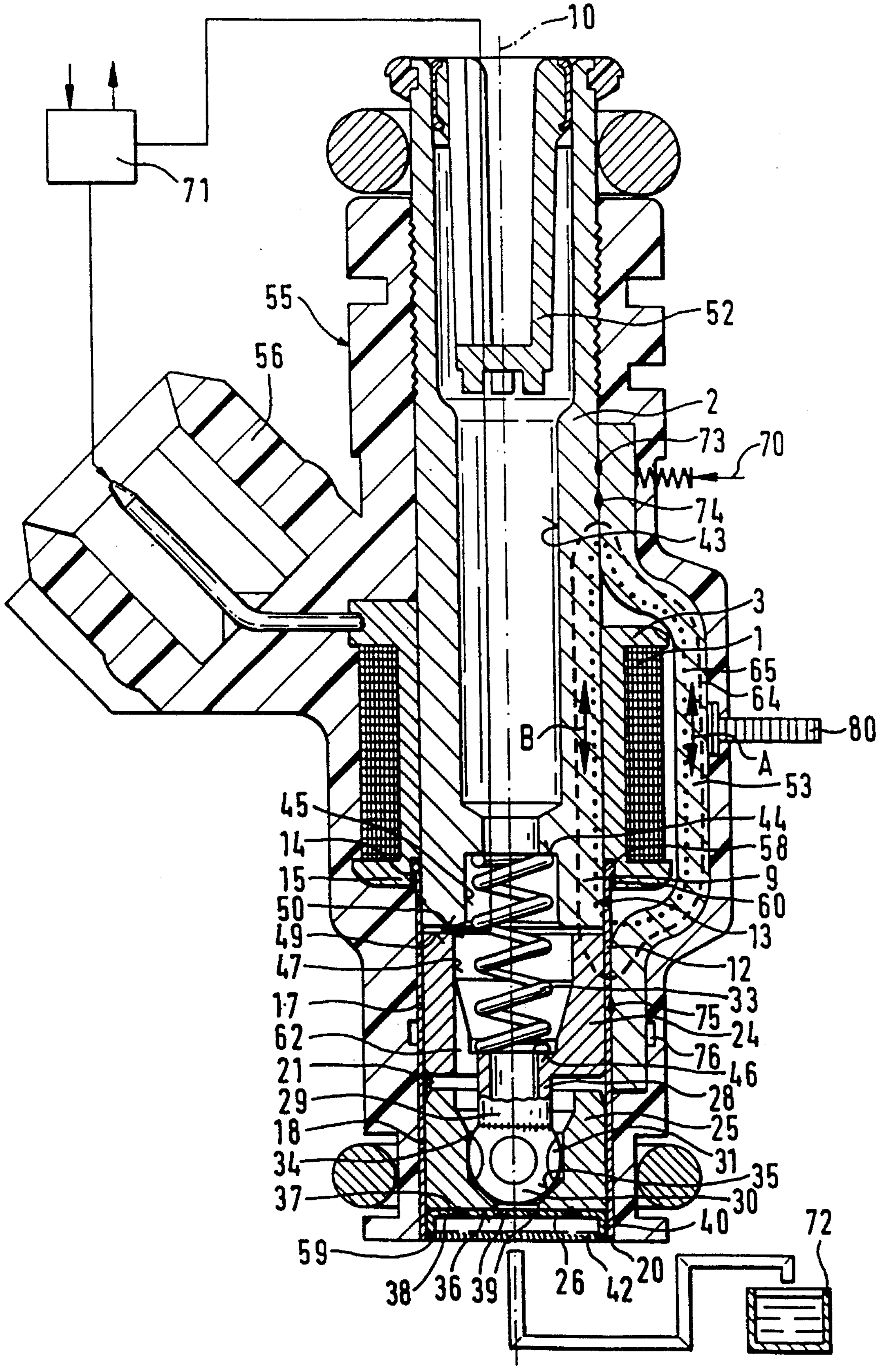
10
71
55
52
56
2
73
70
74
43
3
1
65
64
80
B
A
53
45
44
14
58
15
9
50
60
49
13
47
12
17
33
75
62
24
76
21
46
29
28
18
25
34
31
35
37
30
40
72
59
38
36
39
26
42
20

METHOD FOR ADJUSTING A VALVE

FIELD OF THE INVENTION

The present invention relates to a method for adjusting a valve and more particularly to a method for adjusting the dynamic medium flow quantity of an electromagnetically actuatable valve.

BACKGROUND INFORMATION

In known valves, the dynamic medium flow quantity given off during the opening and closing operation is set by the value of the elastic force of a return spring acting on the valve closure member. The valve known from German Unexamined Patent Application No. 37 27 342 has an adjustment bolt which is displaceably arranged in a longitudinal bore of the internal pole and against one end of which one end of the return spring rests. The depth of insertion of the adjustment bolt into the longitudinal bore of the internal pole determines the value of the elastic force of the return spring. From German Unexamined Patent Application No. 29 42 853 there is known a valve in which the elastic force of the return spring is adjusted by the screwed-in depth of an adjustment screw which can be screwed into the longitudinal bore of the internal pole and against the one end of which one end of the return spring rests.

The adjusting of the dynamic medium flow quantity by the adjustment of the elastic force of the return spring which acts on the valve closure member has, however, the disadvantage that on the completely assembled valve there must be provided a possibility to access the return spring in the form of an easily accessible adjustment element on which an additional seal must be provided.

From European Patent No. 0 301 381 there is already known a method for adjusting the injected quantity of fuel of a fuel injection valve wherein an adjustment tube is introduced up to a predetermined length into a longitudinal bore of a tubular connection piece, the adjustment tube is temporarily fixed in position within the connection piece by press fitting or caulking, the adjustment tube being finally adjusted during verification of the actual quantity of fuel injected and fixed in position in the longitudinal bore of the connection piece by caulking an external circumferential section of the connection piece. This known adjustment method has the disadvantage that, after the final adjusting of the adjustment tube, there is still required as additional operation the fixing in position of the adjustment tube by caulking the external circumferential section of the connection piece and thus deforming the injection valve. Due to the caulking there is the danger that the position of the adjustment tube and thus the quantity of fuel set are changed.

In order to avoid this danger, it has already been proposed in German Patent Application No. P 42 11 723.3 to employ a slit adjustment sleeve which is under an initial tension acting in radial direction whereby the caulking of an external circumferential section of the connection piece for the final fixing in position of said adjustment sleeve in the connection piece is no longer required. The adjustment sleeve therefore assumes its defined position without any deformation of the valve and the medium flow quantity adjusted in final manner is not subject to subsequent changes.

All injection valves which are already known have in common that manipulations with adjustment tools inside the injection valve are required due to the adjusting of differently developed adjustment elements such as adjustment bolts, adjustment screws, adjustment tubes or adjustment sleeves. This results, in each case, in high demands on the quality of the adjustment elements and on a defined manipulation of the adjustment tools so as to avoid deformations within the injection valve. Furthermore, upon the insertion of an adjustment tool into the injection valve, there is always a danger of dirtying. In addition, there is also the danger of the formation of chips upon the movement of the adjustment element inside the injection valve which may have a particularly detrimental effect upon the operation of the injection valve.

SUMMARY OF THE INVENTION

The method, in accordance with the present invention, for adjusting the dynamic medium flow quantity given off by an electromagnetically actuated injection valve, has the advantage that the dynamic medium flow quantity can be adjusted in a simple manner outside the medium flow path and no adjustment element is required inside the injection valve and therefore no adjustment tools are inserted into the injection valve. Thus, a cumbersome adjustment inside the injection valve is avoided and any danger of deformations by caulking or some other fixing in position of an adjustment element inside the injection valve is eliminated, and the risk of dirtying is greatly reduced.

In accordance with the present invention, the adjustment of the dynamic medium flow quantity takes place instead on the circumference of the injection valve by axial displacement of at least one guide element which is developed, for instance, as a yoke and serves as a ferromagnetic element. The at least one guide element surrounds a magnet coil in circumferential direction, at least in Dart, and contacts a core which serves as a fuel inlet connection piece and with which the at least one guide element is firmly connected in a final manner. The axial displacement of the at least one guide element along a valve body, which is held fast in its position, has the result that the ratio of magnetic useful flux to magnetic leakage flux changes over the core and the at least one guide element, entailing a change in the magnetic force so that the dynamic medium flow quantity given off can be influenced and adjusted. Another possibility of adjusting the dynamic medium flow quantity consists in holding the at least one guide element fast by means of a holding tool and moving the valve body axially. The decisive factor for the change of the ratio of magnetic useful flux to magnetic leakage flux is a relative movement of the mounted valve body with respect to the at least one guide element.

BRIEF DESCRIPTION OF THE DRAWING

The FIGURE shows an adjustable electromagnetically actuated injection valve in accordance with the present invention.

DETAILED DESCRIPTION

The electromagnetically actuatable valve shown by way of example in the drawing in the form of an injection valve for fuel injection systems of mixture-compressing internal combustion engines with externally supplied ignition has a tubular core 2 which is surrounded by a magnetic coil 1 and serves as a fuel inlet connection piece. A coil form 3 stepped in the radial direction receives a winding of the magnet coil 1 and, together with the core 2 of constant outside diameter, makes a particularly compact and short structure of the injection valve possible in the region of the magnet coil 1.

A tubular and thin-walled sleeve 12 which serves as a connecting part is connected in a sealed manner to a lower end 9 of the core 2 and is concentric to a longitudinal axis 10 of the valve. The sleeve 12 is connected to the core 2 for instance by welding by means of a first weld seam 13, with said sleeve in part axially surrounding the core end 9 by an upper sleeve section 14. The stepped coil form 3 extends partially over the core 2 and, by a step 15 of larger diameter, over the sleeve section 14 of the sleeve 12 at least partially in the axial direction. The tubular sleeve 12 consisting, for instance, of non-magnetic steel extends downstream over a central sleeve section 17 and a lower sleeve section 18 directly up to a downstream termination 20 of the entire injection valve. The sleeve 12 forms in this connection over its entire axial length a passage opening 21 of constant diameter which extends concentric to the longitudinal axis 10 of the valve. With its central section 17 the sleeve 12 circumferentially surrounds an armature 24, while the sleeve 12 circumferentially surrounds with its lower section 18 a valve seat member 25 and a spray orifice disk 26.

In the passage opening 21 there is arranged a very short valve needle 28 which is developed, for instance, as a tube which is integral with the armature 24 and which extends downstream out of the armature 24. The valve needle 28 is connected, for instance by welding, at its downstream end 29 facing the spray orifice disk 26 to a, for instance, spherical valve closure member 30 on the circumference of which there are, for instance, provided five flattenings 31.

The actuation of the injection valve takes place electromagnetically in a known manner. The electromagnetic circuit with magnet coil 1, core 2 and armature 24 serves for the axial movement of the valve needle 28 and thus for the opening against the elastic force of a return spring 33 or for the closing of the injection valve. A guide opening 34 of the valve seat member 25 serves for guiding the valve closure member 30 during the axial movement of the valve needle 28 and the armature 24 along the longitudinal axis 10 of the valve. The spherical valve closure member 30 cooperates with a valve seat surface 35 of the valve seat member 25, which surface 35 tapers in the direction of flow in the manner of a truncated cone and is developed in the axial direction between the guide opening 34 and a lower end 36 of the valve seat member 25. The circumference of the valve seat member 25 has a slightly smaller diameter than the passage opening 21 of the sleeve 12. At its end 36 facing away from the valve closure member 30, the valve seat member 25 is connected concentrically and firmly, for instance by a circumferential hermetic second weld seam 37, to the, for instance, cup-shaped spray orifice disk 26.

In addition to a bottom part 38 to which the valve seat member 25 is attached and in which at least one, for instance four, spray orifices 39 formed by erosion or punching extend, the cup-shaped spray orifice disk 26 has a circumferential holding edge 40 which extends in the downstream direction. The holding edge is bent downstream conically outward so that it rests with radial pressure against the inner wall of the sleeve 12 defined by the passage opening 21. At its downstream end, the holding edge 40 of the spray orifice disk 26 is connected to the wall of the sleeve 12, for instance by a circumferential and hermetic third weld seam 42 produced, for instance, by means of a laser. A direct flowing of the fuel into an intake line of the internal combustion engine outside the spray orifices 39 is avoided by the weld seams 37 and 42. Due to the two weld seams 13 and 42, there are thus present two points of attachment of the sleeve 12.

Contrary to the injection valves already known, no adjustment element, such as an adjustment tube or adjustment sleeve, is fitted into a stepped flow bore 43 of the core 2 which extends concentric to the longitudinal axis 10 of the valve and serves for feeding the fuel in the direction of the valve seat surface 35. Therefore, the quality of the internal wall of the flow bore 43 in the core 2 is not subject to particularly high requirements. In the region of the end 9 of the core the flow bore 43 is developed in such a manner that the return spring 33 presses against an upper contact surface 44 which is created by a step in the flow bore 43. Immediately upstream of the contact surface 44, the flow bore 43 has a clearly smaller diameter than in an opening 45 into which the return spring 33 extends and the upstream limitation of which is formed by the contact surface 44. The return spring 33 therefore rests with its upper end against the contact surface 44 in the core 2 while the lower end of the return spring 33 rests against a shoulder 46 in the armature 24 at which the transition to the tubular valve needle 28 takes place. The return spring 33 extends in the axial direction partially within the flow bore 43 of the core 2 and also up to the shoulder 46 within a concentric stepped armature opening 47 in the armature 24.

The depth of insertion of the valve seat member 25 having the cup-shaped spray orifice disk 26 is decisive for the stroke of the valve needle 28. In this connection, the one end position of the valve needle 28, when the magnet coil 1 is not excited, is determined by application of the valve closure member 30 against the valve seat surface 35 of the valve seat member 25 while the other end position of the valve needle 28 results, when the magnet coil 1 is excited, from the application of the armature 24 with its upper end 49 against a lower end 50 of the core end 9.

A fuel filter 52 is arranged in the stepped flow bore 43 of the core 2 upstream of the return spring 33. The magnet coil 1 is surrounded by at least one guide element 53 which is developed, for instance, as a yoke, serves as a ferromagnetic element and which at least partially surrounds the magnet coil 1 in the circumferential direction. The at least one guide element 53 rests with its one end against the core 2 and with its other end against the central sleeve section 17 of the sleeve 12 and can be connected to the latter, for instance by welding 73, soldering 74, or cementing 75.

The completely adjusted injection valve is substantially surrounded by a plastic injection molding 55 which, proceeding from the core 2, extends in the axial direction via. the magnet coil 1 and the at least one guide element 53 down to the downstream termination 20 of the injection valve, the injection molding 55 including an electrical cable connector 56 also injection-molded thereon.

By means of the tubular sleeve 12 the injection valve can be built particularly short and compact as well as in a cost-favorable manner. By using the relatively inexpensive sleeve 12, it becomes possible to dispense with the rotating parts customary in injection valves such as valve seat carriers or nozzle holders which are more voluminous due to their larger outside diameter and more expensive in their manufacture than the sleeve 12.

In order to simplify the installation of the sleeve 12, the sleeve 12 has, at its two axial ends, for instance, slightly radially outward bent circumferential edges 58 and 59. The upstream circumferential edge 58 is received in an intermediate space 60 which is formed between the step 15 of the coil form 3 and the core end 9 of the core 2 and into which the upper sleeve section 14 of the sleeve 12 partially extends. The downstream circumferential edge 59 is located in the region of the third weld seam 42 which hermetically connects the sleeve 12 and the spray orifice disk 26, it being possible in this connection for the downstream end of the sleeve 12 and thus also of the downstream circumferential edge 59 to lie at the same axial height as the termination 20 of the injection valve and therefore slightly outside the weld seam 42.

Due to the firm and hermetic connections of the sleeve 12 to the core 2 and the spray orifice disk 26 and thus also the valve seat member 25 by the weld seams 13 and 42, only the armature 24 with the valve needle 28 arid the valve closure member 30 welded thereon, as well as the return spring 33 can move within the sleeve 12. Since the armature 24 has only a slightly smaller outside diameter than the inner wall of the sleeve 12, the armature 24 is guided in the sleeve 12, namely in the central sleeve section 17. In the armature 24 and downstream of the armature opening 47, there is developed at least one fuel duct 62 which is connected to said armature opening 47 and which extends in the axial direction through the armature 24, thus assuring that the fuel passes into the valve seat member 25.

In addition to the reduction in the outside diameter of the injection valve by employing the sleeve 12, the axial length is also clearly reduced as compared with similar injection valves. The armature 24 and the valve needle 28 namely have a substantially smaller axial length than known injection valves. The at least one guide element 53 which is developed in the form of a yoke contacts the sleeve 12 at its central sleeve section 17 and therefore precisely in the region where the armature 24 is located within the sleeve 12. The magnetic flux is thus conducted from the at least one guide element 53 directly via the non-magnetic sleeve 12 to the armature 24.

The methods of the invention for adjusting the dynamic medium flow quantity given off during the opening and closing operation of the valve shown by way of example in the drawing are characterized by a relative movement of the installed valve body, consisting at least of magnet coil 1, core 2, coil form 3, sleeve 12, armature 24, valve seat member 25, spray orifice disk 26, valve closure member 30 and return spring 33, with respect to the at least one guide element 53. The arrows designated A and B indicate the axial movements, with arrow A indicating that the valve body is held fast during the adjusting operation and that the at least one guide element 53 is moved, while arrow B indicates that the at least one guide element 53 is held fast by a holding device 70 while at the same time an axial displacement of the valve body takes place.

In a first method according to the present invention for the adjustment of the dynamic medium flow quantity given off, the installation of the subassemblies in the valve takes place in a known manner. The actual adjustment of the medium flow quantity given off commences only once the firm connections of the sleeve 12 to the core 2 by the first weld seam 13 and of the sleeve 12 to the spray orifice disk 26 and thus the valve seat member 25 by the third weld seam 42 have been created and therefore only once the valve seat member 25, the armature 24 with the valve needle 28 and the return spring 33 have been installed. The stroke of the valve needle 28 results from the depth of insertion of the valve seat member 25, said stroke being thus definitively set. Before the valve body which has been installed in this manner is provided with the plastic injection molding 55, the adjustment of the dynamic medium flow quantity takes place. For this purpose, the at least one guide element 53 is applied against the core 2 and the sleeve 12 in the above-described regions and is temporarily held fast by a holding device 70. The clamping and pressing of the at least one guide element 53 against the core 2 and the sleeve 12 is effected, for instance, by the resilient holding device 70 with only small elastic forces so as to avoid deformations on the guide element 53 or on the valve body as well as changes in the adjustment of the stroke set for the valve needle 28.

The injection valve is thereupon contacted hydraulically and connected to an electronic control device 71. Current pulses having corresponding control frequencies are then applied to the magnet coil 1. In the electromagnetic circuit a magnetic field is formed around the magnet coil 1 so that a magnetic flux occurs via the core 2, the armature 24 and the at least one guide element 53. The electromagnetic circuit serves for the axial movement of the valve needle 28 and thus for the opening against the elastic force of the return spring 33 or for the closing of the injection valve respectively. The magnetic flux can be divided into two components, namely into a magnetic useful flux 64 which is indicated by a dashed line and a magnetic leakage flux 65 indicated by a dotted line. By the axial displacement of one or two guide, elements 53 (arrow A) with respect to the valve body which is held fast in its position, the ratio of magnetic useful flux 64 to magnetic leakage flux 65 can now be influenced. An axial displacement of the at least one guide element 53, for instance in the upward direction and therefore away from the armature 24, has the result that the ratio of magnetic useful flux 64 to magnetic leakage flux 65 is changed to the detriment of the magnetic useful flux 64. For this reason, the magnetic force decreases and the dynamic medium flow quantity given off is reduced.

This adjustment operation therefore takes place with a medium flowing through the injection valve. By means, for instance, of a measuring vessel 72, the dynamic actual medium quantity given off during the opening and closing operation is measured and compared with a desired medium quantity. If the actual medium quantity measured and the predetermined desired medium quantity do not agree, then the at least one guide element 53 is displaced in the axial direction by means of a tool 80 along the valve body which is held fast in its position until the ratio of magnetic useful flux 64 to magnetic leakage flux 65 reaches such a value that the actual medium quantity measured is in agreement with the predetermined desired medium quantity.

Only then is the final fixing in position of the at least one guide element 53 on the valve body effected. Various connection techniques can be used for this, on the one hand for instance firm connections by welding 73, soldering 74 or cementing 75 of the at least one guide element 53 on the core 2 and on the sleeve 12. It is furthermore possible to provide prior to the coating of the injection valve by injection molding by means of a valve injection molding die at least one resilient additional part 76, for instance an annular spring, circumferential over the at least one guide element 53. The plastic injection molding 55 then ultimately completely covers the at least one guide element 53 with the resilient additional part 76. Another attachment variant for the guide element 53 consists in providing a clamping device ill the valve injection molding die so that the at least one guide element 53 is held fast directly by said valve injection molding die. Upon the injection molding, the clamping elements provided in the die are removed in accordance with a predetermined sequence.

A second method according to the present invention for the adjustment of the dynamic medium flow quantity given off differs from the first method according to the invention only by the fact that, in this case, the at least one guide element 53 is held in its position, for instance in a resilient holding device 70, and the valve body is moved axially along the at least one guide element 53, as shown diagrammatically by the arrow B. The adjustment operation then takes place analogously to the first method according to the present invention until the actual medium quantity measured agrees with the predetermined desired medium quantity. The final fixing in position of the at least one guide element 53 is also effected by one of the variants described with respect to the first method according to the present invention.

In a third method according to the present invention for the adjustment of the dynamic medium flow quantity given off, the installation of the subassemblies in the valve also takes place in a known manner. The actual adjustment of the medium flow quantity given off commences only once the firm connections of the sleeve 12 to the core 2 by the first weld seam 13 and of the sleeve 12 to the spray orifice disk 26 and thus of the valve seat member 25 by the third weld seam 42 have been created and therefore only once the valve seat member 25, the armature 24 with the valve needle 28 and the return spring 33 have been installed.

The stroke of the valve needle 28 results from the depth of insertion of the valve seat member 25, the stroke being thus definitively adjusted. Before the valve body which has been installed in this manner is provided with the plastic injection molding 55, the dynamic medium flow quantity is adjusted. For this purpose, the at least one guide element 53, is applied in the above-described regions against the core 2 and the sleeve 12 and temporarily held fast by a holding device 70. The clamping and pressing of the at least one guide element 53 against the core 2 and the sleeve 12 is effected, for instance, by a resilient holding device 70 with only small elastic forces so as to avoid deformations on the guide element 53 or the valve body and changes in the adjustment of the stroke set for the valve needle 28.

The injection valve is thereupon contacted and connected to an electronic control device 71. Current pulses having corresponding control frequencies are then applied to the magnet coil 1. In the electromagnetic circuit a magnet field is formed around the magnet coil 1 so that a magnetic flux occurs via the core 2, the armature 24 and the at least one guide element 53. The electromagnetic circuit serves for the axial movement of the valve needle 28 and thus for the opening against the elastic force of the return spring 33, or for the closing of the injection valve, respectively. The magnetic flux can be divided into two components, namely a magnetic useful flux 64 which is indicated by a dashed line and a magnetic leakage flux 65 indicated by a dotted line. By the axial displacement of one or two guide elements 53 (arrow A) with respect to the valve body which is held fast in its position, the ratio of magnetic useful flux 64 to magnetic leakage flux 65 can now be influenced. An axial displacement of the at least one guide element 53 has the result that the ratio of magnetic useful flux 64 to magnetic leakage flux 65 changes. As a result thereof, the magnetic force assumes different values and the operating time and release time of the armature 24 change so that the opening and closing duration of the valve closure member 30 on the valve seat surface 35 is influenced.

This adjustment operation takes place dry, i.e. no medium flows through the injection valve. The operating and release times of the armature 24 are the decisive parameters for adjusting the dynamic medium flow quantity. Before any exact adjustment can take place, a correlation between operating and release times and the medium flow quantities must be established. Only in this way can the operating and release times measured upon the adjustment operation be converted into comparable values for the medium flow quantities. The at least one guide element 53 is displaced in the axial direction by means of a tool 80 along the valve body held fast in its position until the ratio of magnetic useful flux 64 to magnetic leakage flux 65 reaches such a value that the measured operating and release times of the armature 24 assume the predetermined values which are related to the medium flow quantities to be given off.

Only then is the final fixing in position of the at least one guide element 53 effected. For this purpose, various connection techniques can be employed, for instance, firm connections by welding 73, soldering 74, or cementing 75 of the at least one guide element 53 to the core 2 and the sleeve 12. It is, furthermore, possible to apply, prior to the coating of the injection valve by injection molding by means of a valve injection molding die, at least one resilient additional part 76, for instance an annular spring, circumferentially over the at least one guide element 53. The plastic injection molding 55 then ultimately completely covers the at least one guide element 53 with the resilient additional part 76. Another attachment variant for the guide element 53 consists in providing a clamping device in the valve injection molding die so that a holding fast of the at least one guide element 53 takes place directly by said valve injection molding die. Upon the injection molding, the clamping elements provided in the die are removed accordance with a predetermined sequence.

The principle of the dry adjustment of the third method according to the present invention can also be used in a fourth method according to the present invention in which the principle of the valve body displacement described in the second method of the invention is employed. In this case, therefore, the relative movement between the at least one guide element 53 and the valve body is again achieved in the manner that the at least one guide element 53 is held fast in its position, for instance a resilient holding device 70, and the valve body is moved axially (arrow B) along the at least one guide element 53. In other respects, the adjustment operation takes place in an analogous manner, and all variants already mentioned above of the attachment of the at least one guide element 53 on the core 2 and on the sleeve 12 are possible.

What is claimed is:

1. A method for adjusting a dynamic medium flow quantity given off by an electromagnetically actuatable valve having a valve body which includes a core surrounded by a magnet coil, a connection part extending along a longitudinal axis of the valve, a valve seat member which is connected to the connection part and has a fixed valve seat surface, an armature which can be displaced within the connection part, and a valve closure member which can be actuated by the armature against a force of a return spring and which cooperates with the fixed valve seat surface, comprising the steps of:

applying and temporarily holding against the valve body at least one guide element which is developed as a yoke, serves as a ferromagnetic element, extends in an axial direction from the core to the connection part over the magnet coil, and at least partially surrounds the magnet coil circumferentially;

connecting the valve to a medium supply;

applying current pulses from a control device to the magnet coil, whereby a magnetic field is formed;

measuring an actual dynamic medium quantity given off during opening and closing of the valve;

comparing the actual dynamic medium quantity measured with a predetermined desired medium quantity;

holding the valve body in a fixed position;

displacing the at least one guide element in the axial direction along the valve body until the actual dynamic medium quantity measured substantially equals the predetermined desired medium quantity;

fixing in position the at least one guide element on the valve body; and covering the valve body and the at least one guide element, at least in part, with a plastic injection molding.

2. The method according to claim 1, wherein the at least one guide element is temporarily held against the valve body by a resilient holding device.

3. The method according to claim 1, wherein the step of fixing the at least one guide element on the valve body includes cementing.

4. The method according to claim 1, wherein the step of fixing the at least one guide element on the valve body includes welding.

5. The method according to claim 1, wherein the step of fixing the at least one guide element on the valve body includes soldering.

6. The method according to claim 1, wherein the step of fixing the at least one guide element on the valve body is preceded by surrounding the at least one guide element by a resilient additional part which presses the at least one guide element against the valve body.

7. The method according to claim 1, wherein the step of fixing the at least one guide element on the valve body includes holding the at least one guide element by clamping elements arranged in a valve injection molding die.

8. A method for adjusting a dynamic medium flow quantity given off by an electromagnetically actuatable valve having a valve body which includes a core surrounded by a magnet coil, a connection part extending along a longitudinal axis of the valve, a valve seat member which is connected to the connection part and has a fixed valve seat surface, an armature which can be displaced within the connection part, and a valve closure member which can be actuated by the armature against a force of a return spring and which cooperates with the fixed valve seat surface, comprising the steps of:

applying and temporarily holding against the valve body at least one guide element which is developed as a yoke, serves as a ferromagnetic element, extends in an axial direction from the core to the connection part over the magnet coil, and at least partially surrounds the magnet coil circumferentially;

connecting the valve to a medium supply;

applying current pulses from a control device to the magnet coil, whereby a magnetic field is formed;

measuring an actual dynamic medium quantity given off during opening and closing of the valve;

comparing the actual dynamic medium quantity measured with a predetermined desired medium quantity;

holding the at least one guide element in a fixed position;

displacing the valve body in the axial direction witch respect to the at least one guide element until the actual medium quantity measured substantially equals the predetermined desired medium quantity;

fixing in position the at least one guide element on the valve body; and covering the valve body and the at least one guide element, at least in part, with a plastic injection molding.

9. The method according to claim 8, wherein the at least one guide element is temporarily held against the valve body by a resilient holding device.

10. The method according to claim 8, wherein the step of fixing the at least one guide element on the valve body includes cementing.

11. The method according to claim 8, wherein the step of fixing the at least one guide element on the valve body includes welding.

12. The method according to claim 8, wherein the step of fixing the at least one guide element on the valve body includes soldering.

13. The method according to claim 8, wherein the step of fixing the at least one guide element on the valve body is preceded by surrounding the at least one guide element by a resilient additional part which presses the at least one guide element against the valve body.

14. The method according to claim 8, wherein the step of fixing the at least one guide element on the valve body includes holding the at least one guide element by clamping elements arranged in a valve injection molding die.

15. A method for adjusting a dynamic medium flow quantity given off by an electromagnetically actuatable valve having a valve body which includes a core surrounded by a magnet coil, a connection part extending along a longitudinal axis of the valve, a valve seat member which is connected to the connection part and has a fixed valve seat surface, an armature which can be displaced within the connection part, and a valve closure member which can be actuated by the armature against a force of a return spring and which cooperates with the fixed valve seat surface, comprising the steps of:

applying and temporarily holding against the valve body at least one guide element which is developed as a yoke, serves as a ferromagnetic element, extends in an axial direction from the core to the connection part over the magnet coil, and at least partially surrounds the magnet coil circumferentially;

applying current pulses from a control device to the magnet coil, ,whereby a magnetic field is formed and the armature is displaced;

measuring ,operating and releasing times of the armature;

comparing the measured operating and releasing times of the armature with predetermined operating and releasing times;

holding the valve body in a fixed position;

displacing the at least one guide element in the axial direction along the valve body until the measured operating and releasing times of the armature substantially equal the predetermined values;

fixing in position the at least one guide element on the valve body; and covering the valve body and the at least one guide element, at least in part, with a plastic injection molding.

16. The method according to claim 15, wherein the at least one guide element is temporarily held against the valve body by a resilient holding device.

17. The method according to claim 15, wherein the step of fixing the at least one guide element on the valve body includes cementing.

18. The method according to claim 15, wherein the step of fixing the at least one guide element on the valve body includes welding.

19. The method according to claim 15, wherein the step of fixing the at least one guide element on the valve body includes soldering.

20. The method according to claim 15, wherein the step of fixing the at least one guide element on the valve body is preceded by surrounding the at least one guide element by a resilient additional part which presses the at least one guide element against the valve body.

21. The method according to claim 15, wherein the step of fixing the at least one guide element on the valve body includes holding the at least one guide element by clamping elements arranged in a valve injection molding die.

22. A method for adjusting a dynamic medium flow quantity given off by an electromagnetically actuatable valve having a valve body which includes a core surrounded by a magnet coil, a connection part extending along a longitudinal axis of the valve, a valve seat member which is connected to the connection part and has a fixed valve seat surface, an armature which can be displaced within the connection part, and a valve closure member which can be actuated by the armature against a force of a return spring and which cooperates with the fixed valve seat surface, comprising the steps of:

applying and temporarily holding against the valve body at least one guide element which is developed as a yoke, serves as a ferromagnetic element, extends in an axial direction from the core to the connection part over the magnet coil, and at least partially surrounds the magnet coil circumferentially;

applying current pulses from a control device to the magnet coil, whereby a magnetic field is formed and the armature is displaced;

measuring operating and releasing times of the armature;

comparing the measured operating and releasing times of the armature with predetermined operating and releasing times;

holding the at least one guide element in a fixed position;

displacing the valve body in the axial direction with respect to the at least one guide element until the measured operating and releasing times of the armature substantially equal the predetermined values;

fixing in position the at least one guide element on the valve body; and covering the valve body and the at least one guide element, at least in part, with a plastic injection molding.

23. The method according to claim 22, wherein the at least one guide element is temporarily held against the valve body by a resilient holding device.

24. The method according to claim 22, wherein the step of fixing the at least one guide element on the valve body includes cementing.

25. The method according to claim 22, wherein the step of fixing the at least one guide element on the valve body includes welding.

26. The method according to claim 22, wherein the step of fixing the at least one guide element on the valve body includes soldering.

27. The method according to claim 22, wherein the step of fixing the at least one guide element on the valve body is preceded by surrounding the at least one guide element by a resilient additional part which presses the at least one guide element against the valve body.

28. The method according to claim 22, wherein the step of fixing the at least one guide element on the valve body includes holding the at least one guide element by clamping elements arranged in a valve injection molding die.

* * * * *